United States Patent
Chauhan et al.

(10) Patent No.: US 12,460,020 B2
(45) Date of Patent: Nov. 4, 2025

(54) PROCESS FOR POLYMERIZING FLUOROMONOMERS USING A COMBINATION OF FLUORINATED AND NONFLUORINATED SURFACTANT

(71) Applicant: GUJARAT FLUOROCHEMICALS LIMITED, Noida (IN)

(72) Inventors: Rajeev Chauhan, Bharuch (IN); Gaurav Kumar, Bharuch (IN); P.S. Rao, Bharuch (IN); Navin Soni, Bharuch (IN); B.S. Bhattacharya, Bharuch (IN); Anamika Dutta, Bharuch (IN); Anand Mohan Patel, Bharuch (IN)

(73) Assignee: GUJARAT FLUOROCHEMICALS LIMITED, Noida (IN)

( * ) Notice: Subject to any disclaimer, the term of this patent is extended or adjusted under 35 U.S.C. 154(b) by 600 days.

(21) Appl. No.: 17/913,244

(22) PCT Filed: May 14, 2021

(86) PCT No.: PCT/IB2021/054157
§ 371 (c)(1),
(2) Date: Sep. 21, 2022

(87) PCT Pub. No.: WO2021/229530
PCT Pub. Date: Nov. 18, 2021

(65) Prior Publication Data
US 2023/0151122 A1    May 18, 2023

(30) Foreign Application Priority Data
May 14, 2020   (IN) .............................. 202011020337

(51) Int. Cl.
| | | |
|---|---|---|
| C08F 2/22 | (2006.01) | |
| C08F 2/00 | (2006.01) | |
| C08F 2/26 | (2006.01) | |
| C08F 14/26 | (2006.01) | |
| C08F 114/26 | (2006.01) | |
| C08K 5/14 | (2006.01) | |

(52) U.S. Cl.
CPC ................ *C08F 2/26* (2013.01); *C08F 2/001* (2013.01); *C08F 114/26* (2013.01); *C08K 5/14* (2013.01)

(58) Field of Classification Search
CPC ........ C08F 114/26; C08F 14/26; C08F 14/18; C08F 2/24; C08F 2/26; C08F 2/28; C08F 2/30
See application file for complete search history.

(56) References Cited

U.S. PATENT DOCUMENTS

| | | | |
|---|---|---|---|
| 7,666,928 B2 | 2/2010 | Johnson et al. | |
| 9,255,164 B2 | 2/2016 | Brothers et al. | |
| 2007/0282054 A1* | 12/2007 | Johnson | ..................... C08J 3/07 |
| | | | 524/544 |
| 2008/0114121 A1* | 5/2008 | Brothers | ................. C08F 14/18 |
| | | | 524/599 |
| 2014/0179868 A1* | 6/2014 | Amin-Sanayei | .......... C08F 6/16 |
| | | | 524/745 |

FOREIGN PATENT DOCUMENTS

| | | | |
|---|---|---|---|
| CN | 103467633 A | * 12/2013 | |
| CN | 105367692 A | * 3/2016 | ............ C08F 114/26 |
| WO | 2007062059 | 5/2007 | |
| WO | 2019172382 | 3/2021 | |
| WO | WO-2021053531 A1 | * 3/2021 | .............. C08F 14/26 |
| WO | WO-2021149022 A1 | * 7/2021 | ............ C08F 114/26 |

OTHER PUBLICATIONS

Machine translation into English of CN-105367692-A (Year: 2016).*
Machine translation into English of CN-103467633-A (Year: 2013).*

* cited by examiner

*Primary Examiner* — Karuna P Reddy
(74) *Attorney, Agent, or Firm* — Ling Wu; Stephen Yang; Ling and Yang Intellectual Property

(57) ABSTRACT

The present invention discloses a process for polymerizing fluoromonomers in an aqueous medium to form a fluoropolymer, said process comprising the steps of: (a) forming an aqueous solution comprising a first surfactant combination of at least one fluorinated surfactant and at least one non-10 fluorinated surfactant in a polymerization reactor; (b) pressurizing the polymerization reactor with said fluoromonomers; (c) initiating a polymerization reaction of said fluoromonomers to form said fluoropolymer; (d) propagation of said polymerization reaction, wherein a second surfactant combination of at least one fluorinated surfactant and at least one non-fluorinated surfactant is 15 metered or one shot dosed into the polymerization reactor; and (e) termination of said polymerization reaction after consumption of a desired quantity of said fluoromonomers.

10 Claims, 1 Drawing Sheet

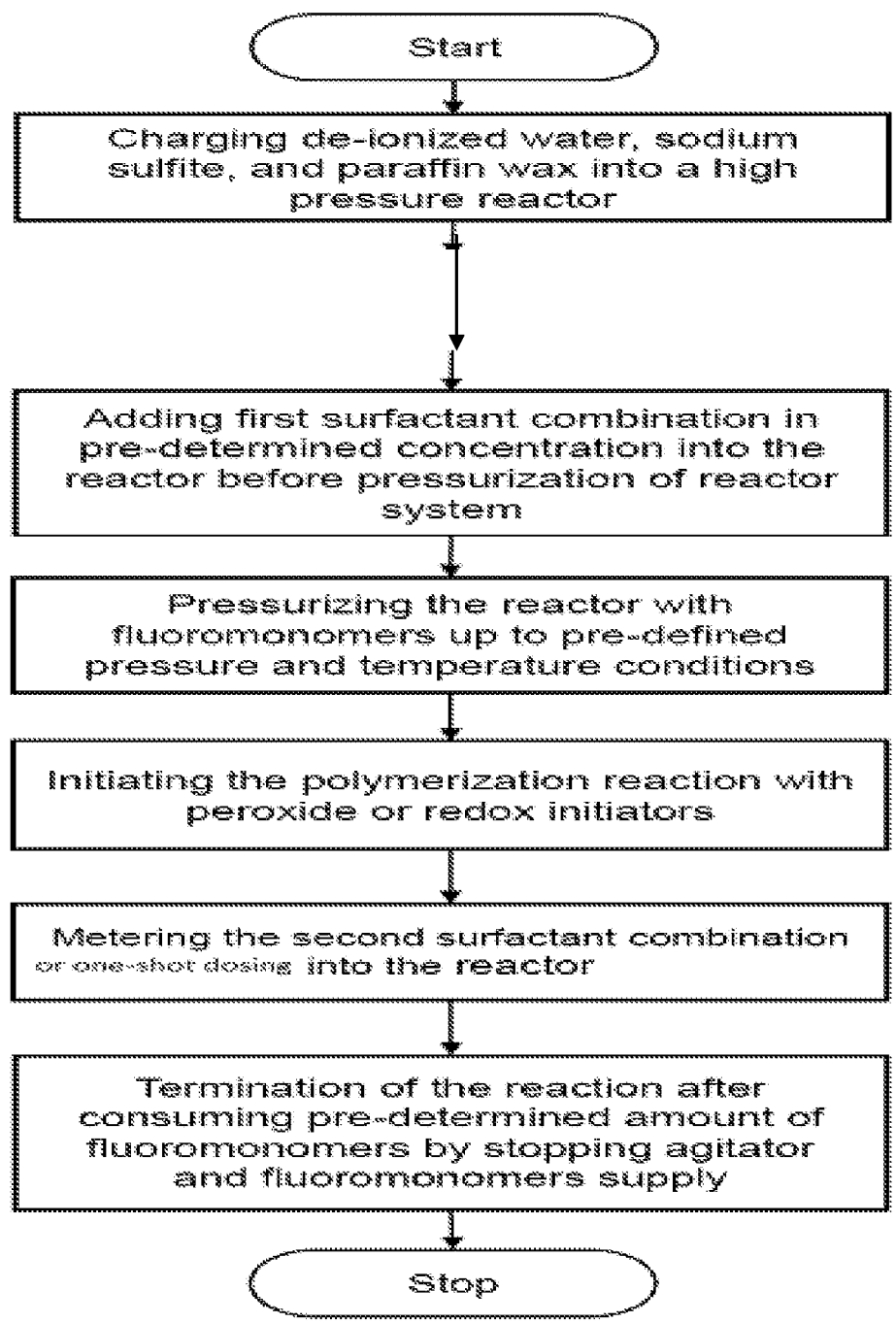

PROCESS FOR POLYMERIZING FLUOROMONOMERS USING A COMBINATION OF FLUORINATED AND NONFLUORINATED SURFACTANT

FIELD OF THE INVENTION

The present invention pertains to a method for polymerizing fluoromonomers using a combination of surfactants. More particularly, the present invention relates to a process for polymerizing fluoromonomers using a combination of a fluorinated and a non-fluorinated surfactant.

BACKGROUND OF THE INVENTION

Fluoropolymers represent a class of materials exhibiting extreme chemical resistance and favorable dielectric properties. Consequently, there is an ever-increasing demand for these materials from industries engaged in manufacturing coatings, tapes and tubing, architectural fabric, nonstick and industrial coatings, fluroelastomer hoses for auto industry and sealing, gaskets and liners for chemical industry, insulation wires and cables, lubricants and so forth. This increasing demand in turn is driving a renewed interest in developing environmental friendly and more efficient routes for manufacturing fluoropolymers. Fluoropolymers are typically synthesized from alkenes in which one or more hydrogen atoms have been replaced by fluorine atom. These include, tetrafluoroethylene (TFE), chlorotrifluoroethylene (CTFE), hexa fluoropylene (HFP), polypropyl vinyl ether (PPVE), polymethyl vinyl ether (PMVE), vinylidene fluoride (VDF), vinylfluoride (VF), etc. Polymerization of the aforesaid monomers affords the corresponding polymers, viz., polytetrafluoroethylene (PTFE), per fluoro alkoxy ether (PFA) polymer, fluorinated ethylene propylene (FEP) polymer, polychlorotrifluoroethylene (PCTFE), polyvinyl fluoride (PVF), polyvinylidene fluoride (PVDF), fluoroelastomers and their modified grades etc.

Fluoropolymers are primarily manufactured via heterogeneous polymerization reactions including aqueous systems. Generally, the reaction requires monomers and a radical initiator in a suitable aqueous reaction medium. Aqueous dispersion polymerization of fluorine containing monomers typically requires a surfactant capable of emulsifying both the reactants and the reaction products for the duration of the polymerization reaction. As discussed below, the surfactant of choice in the synthesis of fluoropolymers is generally a perfluorinated surfactant or a partially fluorinated surfactant. The most frequently used perfluorinated surfactant in the production of fluoropolymers and fluoroelastomers is a Perfluorooctanoic acid (PFOA) salt.

Although, pefluorosurfactants are better in lowering the surface tension of water than comparable hydrocarbon surfactants, fluorinated surfactants persist in the environment for a longer duration and have been detected in humans and wildlife. Annexure-XVII to REACH, Entry 68, by the European Chemicals Agency, places restrictions on the manufacture, placing on the market and use of certain dangerous substances, mixtures and articles containing Perfluorooctanoic acid (PFOA) and its salts. Further, according to the document there are also restrictions on any related substance (including its salts and polymers) having a linear or branched perfluoroheptyl group with the formula C7F15- directly attached to another carbon atom, as one of the structural elements. Also, the use of any related substance (including its salts and polymers) having a linear or branched perfluorooctyl group with the formula C8F17- as one of the structural elements is restricted. According to the document, the aforementioned, shall not be manufactured, or placed on the market as substances on their own from 4 Jul. 2020 onwards. Further, they shall not be used in the production of, or placed on the market in: (a) another substance, as a constituent; (b) a mixture; (c) an article, in a concentration equal to or above 25 ppb of PFOA including its salts or 1000 ppb of one or a combination of PFOA-related substances. Hence, in view of REACH 2020 guidelines of the European Chemicals Agency, there is a need for a process for polymerization of fluoromonomers, which does not involves the use of fluorinated surfactants.

In prior art U.S. Pat. No. 9,255,164B2, A process is provided for the polymerization of fluoromonomer to an dispersion of fluoropolymer particles in an aqueous medium in a polymerization reactor, by (a) providing the aqueous medium in the reactor, (b) adding the fluoromonomer to the reactor, (c) adding initiator to the aqueous medium, the combination of steps (b) and (c) being carried out essentially free of hydrocarbon-containing Surfactant and resulting in the kickoff of the polymerization of the fluoromonomer, and (d) metering hydrocarbon-containing Surfactant into the aqueous medium after the kickoff of polymerization, e.g. after the concentration of the fluoropolymer in the aqueous medium is at least 0.6 wt %, the metering being at a rate reducing the telogenic activity of said Surfactant while maintaining Surface activity.

Another patent WO2019172382A1 discloses a method for producing a fluoropolymer, which is capable of reducing the content of impurities. The present invention is a method for producing a fluoropolymer, which is characterized by comprising a polymerization step wherein a fluoropolymer is obtained by carrying out polymerization of a fluoromonomer in an aqueous medium in the presence of a surfactant, and which is also characterized in that the surfactant is a carboxylic acid type hydrocarbon-containing surfactant.

In prior art there were carboxylic acid type surfactant and other type of surfactant, there was a need to establish use of a non fluorinated sulfonate type hydrocarbon containing surfactant along with fluorinated surfactant in polymerization process.

A process for the polymerization of fluoromonomers using a non-fluorinated surfactant would solve the aforestated issues of persistence in the eco-system, bio-accumulation of fluorosurfactants. However, the exclusive use of non-fluorinated surfactants in polymerization reaction results in inhibition of the reaction and formation of fluoropolymers with low molecular weights. Moreover, the exclusive use of non-fluorinated surfactants might prevent kickoff of the polymerization reaction or inhibit the rate of the polymerization reaction after kickoff. Degradation of the surfactant prior to kickoff of the polymerization reaction might prevent inhibition of the polymerization reaction due to the exclusive use of non-fluorinated surfactant. Degradation of the surfactant using a suitable degradation agent, leads to reduction or elimination of telogenicity. Telogenicity, in effect, leads to inhibition of the polymerization reaction.

However, a facile process for polymerization, which does not involves the use of degradation agents for passivating the surfactants is highly desirable for reducing costs, time duration and complexity of the polymerization process, even if it requires addition of a small amount of fluorinated surfactant.

Consequently, there is a need to explore a process for polymerizing fluoromonomers to produce fluoropolymers having low to high molecular weights, using a combination of fluorinated and non-fluorinated surfactants, which is devoid of passivating the surfactant.

OBJECTIVES OF THE INVENTION

The main objective of the invention is to overcome the aforestated problems in the prior art.

The other objective of the present invention is to provide a process for the aqueous dispersion polymerization of fluoromonomers using a combination of fluorinated and non-fluorinated surfactants.

It is yet another objective of the invention to provide a simplified one step process for the preparation of fluoropolymers.

It is another objective of the invention to provide a process for preparing fluoropolymers, which is devoid of the step of passivating the surfactants.

It is another objective of the invention to provide a process for preparing fluoropolymers, with optimum particle size.

Yet another objective of the present invention is to provide a fluoropolymer dispersion comprising a combination of fluorinated surfactants and non-fluorinated surfactants.

Yet another objective of the present invention is to produce low to high molecular weight fluoropolymers using a combination of fluorinated and non-fluorinated surfactants.

SUMMARY OF THE INVENTION

The present invention relates to a process for preparing high molecular weight fluoropolymers using a combination of fluorinated surfactants and non-fluorinated surfactants.

In accordance with an embodiment of the invention there is provided a process for polymerizing fluoromonomers in an aqueous dispersion medium to form a fluoropolymer, said process comprising the steps of:
a) forming an aqueous solution comprising a first surfactant combination of at least one fluorinated surfactant and at least one non-fluorinated surfactant in a polymerization reactor;
b) pressurizing the polymerization reactor with said fluoromonomers;
c) initiating a polymerization reaction of said fluoromonomers to form said fluoropolymer;
d) propagation of said polymerization reaction, wherein a second surfactant combination of at least one fluorinated surfactant and at least one non-fluorinated surfactant is metered or one-shot dosed into the polymerization reactor;
e) termination of said polymerization reaction after consumption of a desired quantity of said fluoromonomers;
wherein the molecular weight of the fluoropolymer ranges from $1\times10^3$ to $9\times10^8$, and wherein the proportions between the at least one fluorinated surfactant and the at least one non-fluorinated surfactant within the first surfactant combination is either the same or different from the proportions between the at least one fluorinated surfactant and the at least one non-fluorinated surfactant within the second surfactant combination.

An aqueous emulsion of fluoromonomers is formed within step b) by pressurizing the polymerization reactor with said fluoromonomers.

The polymerization reaction is initialized by using at least one initiator. Preferably, the at least one initiator is selected from a group consisting of Disuccinic Acid Peroxide (DSAP), Ammonium Persulphate (APS), redox initiators and combinations thereof.

In accordance with another embodiment of the invention, the process is devoid of passivating the at least one non-fluorinated surfactant in the first surfactant combination and/or the second surfactant combination.

Preferably, the first surfactant combination is added in one shot into the reactor, whereas the second surfactant combination is preferably metered or one shot dosed into the polymerization reactor during the polymerization reaction at a pre-determined rate. However, both embodiments described above can be used in combination or separately.

Optionally, the aqueous emulsion may comprise stabilizing agents such as paraffin wax.

In accordance with yet another embodiment, the at least one fluorinated surfactant within the first surfactant combination is either the same as or different from the at least one fluorinated surfactant within the second surfactant combination. Likewise, the at least one non-fluorinated surfactant within the first surfactant combination is either the same as or different from the at least one non-fluorinated surfactant within the second surfactant combination.

In accordance with still another embodiment, the at least one fluorinated surfactant within the first surfactant combination or the second surfactant combination is either fully fluorinated or partially fluorinated.

The at least one fluorinated surfactant has structure represented by formula 1,

Formula 1

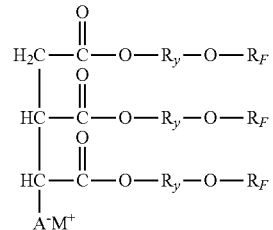

Wherein
$R_f$– is a fully or partially fluorinated linear or branched alkyl group with carbon number 2 to 5.
$R_y$– branched or unbranched alkyl group with carbon number 2 to 6.
$A^-$ contains at least one anionic head group selected from —COO$^-$, —SO$_3^-$, etc.
$M^+$ is a monovalent cation selected from hydrogen, an alkali metal or ammonium ion Preferably, In another embodiment, the at least one fluorinated surfactant useful in the present invention is Perfluorobutanesulfonic acid or a salt thereof.

In an embodiment, the at least one non-fluorinated surfactant is $$Rl\text{-}[ArnXn\text{-}1]\text{-}(SO3M+)m \qquad \text{Formula 2}$$

wherein
R being an alkyl group consisting of a number of 2 to 20 carbon atoms;
l being an alkyl group varying from integer from 1 to 2
Ar being an aryl group;
n being an integer ranging from 1 to 2;
X being a bridging between aryl groups Ar, wherein the bridging is CH$_2$ or linkage by either an ether or an amine function or N (C$_2$H$_5$)$_3$ or carbonyl group (C=O)
M+ being a monovalent cation consisting of hydrogen, an alkali metal, NH$_4^+$ or combinations thereof; and
m being an integer ranging from 1 to 2.

In accordance with still another embodiment, the first surfactant combination contains the at least one fluorinated surfactant in an amount higher than the at least one non-fluorinated surfactant and/or the second surfactant combination contains the at least one fluorinated surfactant in an amount smaller than the at least one non-fluorinated surfactant.

Preferably, surfactant proportions (fluorinated surfactant):(non-fluorinated surfactant) within the first surfactant combination are between 90:10 and 100:0.

Preferably, the surfactant proportions (fluorinated surfactant):(non-fluorinated surfactant) within the second surfactant combination are between 20:80 and 5:95. Addition of first surfactant combination—fluorinated surfactant may range from 90-100% and Non fluorinated surfactant may range from 0-10%. of the the total composition. It may range greater than or equal to 72 ppm. A highly advantageous embodiment especially contains both of those constraints mentioned above.

BRIEF DESCRIPTION OF ACCOMPANYING DRAWINGS

FIG. 1: Is a flow diagram illustrating process steps in accordance with one embodiment of the present invention.

DETAILED DESCRIPTION OF THE INVENTION

Discussed below are some representative embodiments of the present invention. The invention in its broader aspects is not limited to the specific details and representative methods. An illustrative example is described in this section in connection with the embodiments and methods provided.

It is to be noted that, as used in the specification, the singular forms "a," "an," and "the" include plural referents unless the context clearly dictates otherwise. Thus, for example, reference to a composition containing "a compound" includes a mixture of two or more compounds. It should also be noted that the term "'or" is generally employed in its sense including "and/or" unless the content clearly dictates otherwise.

The expression of various quantities in terms of "%" or "% w/w" means the percentage by weight of the total solution or composition unless otherwise specified.

The present invention, in all its aspects, is described in detail as follows:

Described herein is a novel process that minimizes the use of perfluorinated or partially fluorinated surfactants in the polymerization of fluoromonomers, without adding complex reaction steps. The novel process for preparing fluoromonomers of low to high molecular weight, utilizing a combination of fluorinated and non-fluorinated surfactants, comprises the steps of:
  a) forming an aqueous solution comprising a first surfactant combination of at least one fluorinated surfactant and at least one non-fluorinated surfactant in a polymerization reactor;
  b) pressurizing the polymerization reactor with said fluoromonomers;
  c) initiating a polymerization reaction of said fluoromonomers to form said fluoropolymer;
  d) propagation of said polymerization reaction, wherein a second surfactant combination of at least one fluorinated surfactant and at least one non-fluorinated surfactant is metered into the polymerization reactor;
  e) termination of said polymerization reaction after consumption of a desired quantity of said fluoromonomers;

wherein the molecular weight of the fluoropolymer ranges from $1 \times 10^3$ to $9 \times 10^8$, and wherein the proportions between the at least one fluorinated surfactant and the at least one non-fluorinated surfactant within the first surfactant combination is either the same or different from the proportions between the at least one fluorinated surfactant and the at least one non-fluorinated surfactant within the second surfactant combination. The non fluorinated, hydrocarbon containing sulfonate type surfactant comprises 18 to 36 carbon atoms.

Preferably, pressurizing the polymerization reactor may be done with said fluoromonomers results in an aqueous emulsion of fluoromonomers within step (b).

The aqueous emulsion formed in the present invention comprises surfactants, fluoromonomers, initiators, and optionally paraffin wax.

Surfactant

The term "surfactant" means a type of molecule which has both hydrophobic and hydrophilic portions, which allows it to stabilize and disperse hydrophobic molecules and aggregates of hydrophobic molecules in aqueous systems.

The at least one fluorinated surfactant has structure represented by formula 1

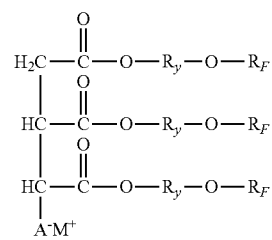

Wherein $R_f$- is a fully or partially fluorinated linear or branched alkyl group with carbon number 2 to 5.

$R_y$- branched or unbranched alkyl group with carbon number 2 to 6.

$A^-$ contains at least one anionic head group selected from —COO$^-$, —SO$_3$—, etc.

$M^+$ is a monovalent cation selected from hydrogen, an alkali metal or ammonium ion Fluorinated surfactants useful for the polymerization of fluoromonomers according to the embodiments of the present invention, include but not limited to, sodium or potassium salt of perfluorobutane sulfonic acid, branched $C_2$ or $C_3$ short chain, dimer or trimer, fluorinated surfactants. One such branched $C_2$ short chain fluorinated surfactant useful in the present invention is partially fluorinated comprises only $C_2$ fluoro-chains, and shows no oral, aquatic and inhalation toxicity. Tests of the surfactant on bacterial cultures did not show any mutagenicity, and no bioaccumulation was observed.

Examples of the non-fluorinated surfactants useful in the present invention, include but not limited to, sulfonate type hydrocarbon surfactant, or a salt thereof, Preferably, the non fluorinated, hydrocarbon containing sulfonate type surfactant comprises 18 to 36 carbon atoms, wherein the molecular weight of the fluoropolymer ranges from $1 \times 10^3$ to $9 \times 10^8$.

The sulfonate type hydrocarbon surfactant has a structure represented by $$Rl\text{-}[ArnXn\text{-}1]\text{-}(SO3M_+)m \qquad \text{Formula 2}$$

Wherein;
R being an alkyl group consisting of a number of 2 to 20 carbon atoms;
l being an alkyl group varying from integer from 1 to 2
Ar being an aryl group;
n being an integer ranging from 1 to 2;
X being a bridging between aryl groups Ar, wherein the bridging is $CH_2$ or linkage by either an ether or an amine function or $N(C_2H_5)_3$ or carbonyl group (C=O)
$M_+$ being a monovalent cation consisting of hydrogen, an alkali metal, $NH_4^+$ or combinations thereof; and
m being an integer ranging from 1 to 2.

In an embodiment, a non-fluorinated, hydrocarbon containing, sulfonate type surfactant in accordance with an embodiment has a structure (STR1) represented by Formula 1;

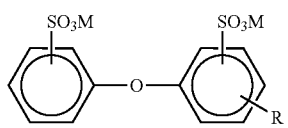
STR1

Wherein R is an alkyl group and M is a monovalent cation selected from the group consisting of hydrogen ions, alkali metal ions and ammonium ions. Preferably, R may be a branched alkyl group or a linear alkyl group. Preferably, M is selected from the group consisting of potassium, sodium and ammonium.

In an embodiment, a non-fluorinated, hydrocarbon containing, sulfonate type surfactant in accordance with an embodiment has a structure (#STR 2) represented by Formula 1,

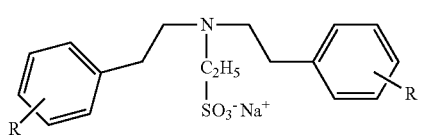
STR2

Wherein R being an alkyl group consisting of a number of 2 to 20 carbon atoms;

In an embodiment, a non-fluorinated, hydrocarbon containing, sulfonate type surfactant in accordance with an embodiment has a structure (#STR 3) represented by Formula 1

STR3

Wherein R being an alkyl group consisting of a number of 2 to 20 carbon atoms.

In an embodiment, a non-fluorinated, hydrocarbon containing, sulfonate type surfactant in accordance with an embodiment has a structure (#STR 4) represented by Formula 1;

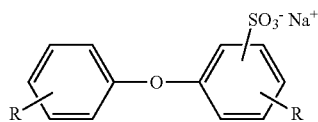
STR 4

Wherein R being an alkyl group consisting of a number of 2 to 20 carbon atoms.

In an embodiment, a non-fluorinated, hydrocarbon containing, sulfonate type surfactant in accordance with an embodiment has a structure (#STR 5) represented by Formula 1;

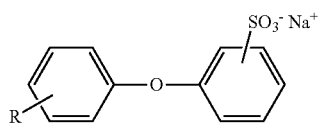
STR 5

In an embodiment, a non-fluorinated, hydrocarbon containing, sulfonate type surfactant in accordance with an embodiment has a structure (#STR 6) represented by Formula 1,

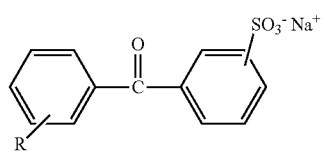
STR 6

Wherein R being an alkyl group consisting of a number of 2 to 20 carbon atoms

In an embodiment, a non-fluorinated, hydrocarbon containing, sulfonate type surfactant in accordance with an embodiment has a structure (#STR 7) represented by formula 1

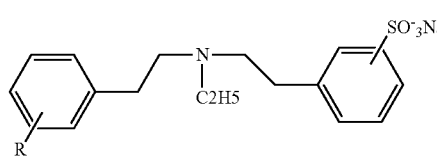
STR7

Wherein R being an alkyl group consisting of a number of 2 to 20 carbon atoms.

The at least one fluorinated surfactant used in the present invention within the first surfactant combination is either the same as or different from the at least one fluorinated surfactant within the second surfactant combination.

Likewise, the at least one non-fluorinated surfactant used in the present invention within the first surfactant combination is either the same as or different from the at least one non-fluorinated surfactant within the second surfactant combination.

Preferably, the first surfactant combination is added in one shot into the reactor and the second surfactant combination is metered into the polymerization reactor during the polymerization reaction at a pre-determined rate. More preferably, the first surfactant combination is added into the polymerization reactor in one shot prior to kickoff of the polymerization reaction, and the second surfactant combination is metered into the polymerization reactor after consumption of predetermined amount of fluoromonomer.

In some embodiments, the first surfactant combination contains the at least one fluorinated surfactant in an amount higher than the at least one non-fluorinated surfactant and/or the second surfactant combination contains the at least one fluorinated surfactant in an amount smaller than the at least one non-fluorinated surfactant.

In alternate embodiments, the first surfactant combination and/or the second surfactant combination consists of only one fluorinated and/or only one non-fluorinated surfactant.

Addition of first surfactant combination—fluorinated surfactant may range from 90-100% and Non fluorinated surfactant may range from 0-10% of the the total composition. It may range greater than or equal to 72 ppm Fluoromonomers The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" and fluoroelastomers means a polymer or elastomer formed by the polymerization of at least one fluoromomer, and it is inclusive of homopolymers, copolymers, terpolymers and higher polymers. Examples of fluoromonomers that can be used in the present invention include but are not limited to tetrafluoroethylene (TFE), Hexa Fluopropylene (HFP), Polypropyl vinyl Ether (PPVE), Polymethyl Vinyl Ether (PMVE), chlorotrifluoroethylene (CTFE), vinylidene fluoride (VDF), vinylfluoride (VF), and so forth, each of which can be used individually or in combination. Preferably, the fluoromonomer is tetrafluoroethylene (TFE) and the fluoropolymer is polytetrafluoroethylene (PTFE). Although, the embodiments of the present invention are described in terms of polymerization of TFE, the process described herein can be applied to the polymerization of any fluoromonomer. The aqueous emulsion further comprises an initiator for initiating the polymerization process.

Initiators

The term "initiator" and the expressions "radical initiator" and "free radical initiator" refer to a chemical that is capable of providing a source of free radicals, either induced spontaneously, or by exposure to heat or light. Examples of suitable initiators include peroxides, peroxy dicarbonates and azo compounds. Initiators may also include reduction-oxidation systems which provide a source of free radicals. The term "radical" and the expression "free radical" refer to a chemical species that contains at least one unpaired electron. The radical initiator is added to the reaction mixture in an amount sufficient to initiate and maintain the polymerization reaction rate. The radical initiator may comprise a persulfate salt, such as sodium persulfate, potassium persulfate, or ammonium persulfate. Alternatively, the radical initiator may comprise a redox system. "Redox system" is understood by a person skilled in the art to mean a system comprising an oxidizing agent, a reducing agent and optionally, a promoter as an electron transfer medium. In a preferred embodiment, the radical initiator is selected from the group consisting of Disuccinic Acid Peroxide (DSAP), Ammonium Persulphate (APS), redox initiator and combinations thereof. These radical initiators may also function as oxidizing agents and may form redox systems with reducing agents such as sodium sulfite and sodium bisulfite. The addition of oxidizing agent may ranges from 80-300 ppm. The addition of reducing agent may range above 7 ppm.

Chain Transfer Agents

Chain transfer agents, also referred to as modifiers or regulators, comprise of at least one chemically weak bond. A chain transfer agent reacts with the free-radical site of a growing polymer chain and halts an increase in chain length. Chain transfer agents are often added during emulsion polymerization to regulate chain length of a polymer to achieve the desired properties in the polymer. Examples of chain transfer agents that can be used in the present invention include, but not limited to, halogen compounds, hydrocarbons in general, aromatic hydrocarbons, thiols (mercaptans), alcohols and so forth; each of which can be used individually or in combination.

Polymerization Conditions

The temperature for the polymerization reaction may vary, for example, from 15 to 110° C., depending on the initiator system chosen and the reactivity of the fluoromonomer(s) selected. In a preferred embodiment, the polymerization is carried out at a temperature in the range of 65 to 100° C. Preferably, the non-fluorinated surfactants used in the present invention are not passivated prior to adding the polymerization reactor.

The pressure used for polymerization may vary from 2-200 bar, depending on the reaction equipment, the initiator system, and the monomer selection. In a preferred embodiment, the reaction is carried out at a pressure in the range of 10 to 60 bar.

The polymerization occurs under stirring or agitation. The stirring may be constant, or may be varied to optimize process conditions during the course of the polymerization. In one embodiment, both multiple stirring speeds and multiple temperatures are used for controlling the reaction.

According to an embodiment of the process of the invention, a pressurized polymerization reactor equipped with a stirrer and heat control means is charged with water, preferably deionized water. Paraffin wax may optionally be added.

Prior to introduction of the surfactant, and monomer or monomers into the reaction vessel and commencement of the reaction, air is preferably removed from the reactor in order to obtain an oxygen-free environment for the polymerization reaction. Preferably, the oxygen is removed from the reaction vessel until its concentration is less than 10 ppm. The reactor may also be purged with a neutral gas such as, for example, nitrogen or argon.

A first surfactant combination in accordance with the invention is added into the polymerization reactor. Preferably, the first surfactant combination is added in an amount greater than 50 ppm, based on the weight of the aqueous medium, in one shot into the polymerization reactor. More preferably the fluorinated surfactants are added in an amount greater than 50 ppm and the non-fluorinated surfactants are added in an amount greater than 1 ppm based on the weight of the de-ionized water in the polymerization reactor. Preferably, surfactant proportions (fluorinated surfactant):(non-fluorinated surfactant) within the first surfactant combination are between 90:10 and 100:0. The first surfactant combination may be dissolved in a suitable solvent before adding into the polymerization reactor. Addition of first surfactant combination-fluorinated surfactant may range from 90-100% and Non fluorinated surfactant may range from 0-10% of the the total composition. It may range greater than or equal to 72 ppm The reactor is then heated up to the reaction temperature and pressurized with at least one fluoromonomer. Thereafter, initiators are added into the reaction vessel to initiate the polymerization reaction. Preferably, the initiator is added in an amount in the range from 70 to 1500 ppm, based on the weight of the de-ionized water.

After initiating the polymerization reaction, the second surfactant combination of fluorinated surfactants and non-fluorinated surfactants is metered or one shot dosed into the polymerization reactors at a rate ranging from 0.02 g/Lh to 0.06 g/Lh. Preferably, the second surfactant combination is added in an amount in the range of 100 to 4000 ppm, more preferably in an amount of 200 to 3500 ppm, based on the weight of the aqueous medium. More preferably, the fluorinated surfactants are added in an amount greater than 10 ppm and the non-fluorinated surfactants are added in an amount greater than 150 ppm based on the weight of the de-ionized water in the polymerization reactor. Preferably, the surfactant proportions (fluorinated surfactant):(non-fluorinated surfactant) within the second surfactant combination are between 20:80 and 5:95. The second surfactant combination may be dissolved in a suitable solvent before metering into the polymerization reactor. Metering or one-shot dosing of the second surfactant combination into the polymerization reactor is commenced after a drop in the reactor pressure in the range of 0.5 to 0.7 bar or a consumption of about 1 to 3.5 kg of the fluoromonomers. Addition of second surfactant combination—fluorinated surfactant may range up to 10% and Non-fluorinated surfactant may range upto 90% of the total composition.

Upon completion of the polymerization reaction, the reactor is brought to ambient temperature and the residual unreacted monomer is vented to atmospheric pressure. The aqueous reaction medium containing the fluoropolymer is then recovered from the reaction vessel. Preferably, the solid content ranges from 10 to 65%, more preferably from 20 to 30% and the particle size of the fluoropolymer particles ranges from 80 to 350 nm. After consumption of defined quantity of fluoromonomers, stop the fluoromonomers supply and agitator.

The present invention is more particularly described in the following example that is intended as illustration only, since numerous modifications and variations within the scope of the present invention will be apparent to those skilled in the art. Unless otherwise noted, all parts, percentages, and ratio reported in the following examples are on a weight basis, and all reagents used in the examples were obtained or are available from the chemical suppliers.

The following examples illustrate the basic methodology and versatility of the present invention.

EXAMPLES

Example-1

A 150 L polymerization reactor equipped with a stirrer and heat control means was charged with 70 L of water, preferably deionized water, and 3 g of paraffin wax.

Prior to introduction of the surfactant, and monomer or monomers into the reaction vessel and commencement of the reaction; air was removed from the reactor in order to obtain an oxygen-free, oxygen concentration of less than 10 ppm, environment for the polymerization reaction, and a first-surfactant-Combination of fluorinated surfactant, and non-fluorinated surfactant in a ratio of 95-100:0-5 was added. Oxalic acid 57 ppm was added as reducing agent. The reactor was then heated up to the reaction temperature of 70 to 75° C. and pressurized to 24 Kg/cm² with tetrafluoroethylene (TFE) monomer. Thereafter, initiators potassium permanganate ($KMnO_4$) was added in continuous manner the reaction vessel to initiate the polymerization reaction. After initiating the polymerization reaction, and consumption of 5.2% of total TFE consumption, the second surfactant combination comprising fluorinated and non-fluorinated surfactant in a ratio of 5:95 and combination of ammonium persulfate (7.14 ppm) and disuccinic acid peroxide (428.6 ppm) were added in one-shot into the polymerization reactor.

Upon consumption of 24 kg of TFE in the polymerization reaction, the reactor was brought to ambient temperature and the residual unreacted monomer was vented to atmospheric pressure for recovery. The aqueous reaction medium containing the fluoropolymer is then recovered from the reaction vessel. The latex concentration was 23.44% and the latex particle size of the fluoropolymer particles was 219.9 nm.

Example-2

As per example-1 polymerization system and condition, a first surfactant combination of fluorinated and non-fluorinated surfactant in a ratio of 95-100:0-5 was added. Oxalic acid 57 ppm was added as reducing agent. The reactor was then heated up to the reaction temperature of 70 to 75° C. and pressurized to 24 Kg/cm² with tetrafluoroethylene (TFE) monomer. Thereafter, initiators potassium permanganate ($KMnO_4$) was added in continuous manner the reaction vessel to initiate the polymerization reaction. After initiating the polymerization reaction, and consumption of 5.4% of total TFE consumption, the second surfactant combination comprising fluorinated and non-fluorinated surfactant in a ratio of 5:95 and disuccinic acid peroxide (857.14 ppm) were added in one-shot into the polymerization reactor.

Upon consumption of 24 kg of TFE in the polymerization reaction, the reactor was brought to ambient temperature and the residual unreacted monomer was vented to atmospheric pressure for recovery. The aqueous reaction medium containing the fluoropolymer is then recovered from the reaction vessel. The latex concentration was 22.91% and the latex particle size of the fluoropolymer particles was 234.3 nm.

Example-3

As per example-1 polymerization system and condition, a first surfactant combination of fluorinated and non-fluorinated surfactant in a ratio of 95-100:0-5 was added. The reactor was then heated up to the reaction temperature of 85 to 90° C. and pressurized to 24 Kg/cm² with tetrafluoroethylene (TFE) monomer. Thereafter, initiators ammonium persulfate (7.14 ppm) and disuccinic acid peroxide (514.28 ppm) were added the reaction vessel to initiate the polymerization reaction. After initiating the polymerization reaction, and consumption of 5.4% of total TFE consumption, the second surfactant combination comprising fluorinated and non-fluorinated surfactant in a ratio of 5:95 and disuccinic acid peroxide (857.14 ppm) were added in one-shot into the polymerization reactor.

Upon consumption of 24 kg of TFE in the polymerization reaction, the reactor was brought to ambient temperature and the residual unreacted monomer was vented to atmospheric pressure for recovery. The aqueous reaction medium containing the fluoropolymer is then recovered from the reaction vessel. The latex concentration fluoropolymer is then recovered from the reaction vessel. The latex concentration was 25.0% and the latex particle size of the fluoropolymer particles was 181.3 nm.

Example-4

As per example-1 polymerization system and condition, a first surfactant combination of fluorinated and non-fluoritaining the fluoropolymer is then recovered from the reaction vessel. The latex concentration fluoropolymer is then recovered from the reaction vessel. The latex concentration was 25.52% and the latex particle size of the fluoropolymer particles was 204.8 nm.

SUMMARY OF EXAMPLES

|  | Units | Example-1 | Example-2 | Example-3 | Example-4 |
|---|---|---|---|---|---|
| Preparation work |  |  |  |  |  |
| DI Water | litres | 70 | 70 | 70 | 70 |
| wax | kg | 3 | 3 | 3 | 3 |
| Fluorinated surfactant | g | 4.75 | 3.5 | 4 | 4 |
| Non-Flluorinated | g | 0.1 | 0.5 | 0.1 | 0.1 |
| Agitator | RPM | 50 | 50 | 50 | 50 |
| Reactor Pressure with TFE | bars | 24 | 24 | 24 | 24 |
| Pressure drop | Actual | 24-23.3 | 24-23.3 | 24-23.3 | 24-23.3 |
| Reaction Start temp | °C. | 74.03 | 75.47 | 92 | 90.4 |
| Concentration of $KMnO_4$ | % | 0.025 | 0.025 | — | — |
| DSAP for reaction kick-off | g | — | — | 36 | 36 |
| APS for reaction kick off | g | — | — | 0.5 | 0.1 |
| KMnO4 initial dosing rate for reaction kick-off | g/min | 50 | 50 | — | — |
| KMnO4 dosing rate immediate after pressure drop | g/min | 12 | 12 | — | — |
| Prepare Surfactant solution in 1 L DI water |  | metering or one-shot dosing | metering or one-shot dosing | metering or one-shot dosing | metering or one-shot dosing |
| Fluorinated surfactant | g | 0.9 | 0.9 | 0.9 | 0.9 |
| Non-Flluorinated | g | 17.1 | 17.1 | 17.1 | 17.1 |
| DSAP mix with surfactant soln | g | 30 | 60 | 60 | 30 |
| APS mix with surfactant soln | g | 0.5 | 0 | 0 | 0 |
| Surfactant dosing start at TFE consumption | kg TFE | 1.3 | 1.3 | 1.3 | 1.3 |
| End Temperature | °C. | 75 | 75.36 | 91 | 89.37 |
| TFE consumption | kg | 24 | 24 | 23.5 | 24 |
| KMNO4solution consumption | kg (0.025%) | 3.68 | 4.37 | — | — |
| Active KMNO4 | g | 0.92 | 1.0925 | — | — |
| Reaction Time | min | 219 | 191 | 132 | 177 |
| Results on Liquids |  |  |  |  |  |
| Latex Conc | % | 23.44 | 22.91 | 25 | 25.52 |
| LPS | nm | 219.9 | 234.3 | 181.9 | 204.8 |
| pH |  | 2.64 | 2.66 | 2.6 | 2.7 |
| Results on Solids |  |  |  |  |  |
| SSG | g/cm3 | 2.169 | 2.170 | 2.197 | 2.180 |
| ESG | g/cm3 | 2.188 | 2.191 | 2.223 | 2.197 |
| PEX (400:1) | MPa | 32.92 | 33.02 | 37.7 | 35.35 |
| Melting point (1st) | °C. | 344.37/339.31 | 339.15 | 338.27 | 339.12 |
| Full width at half maximum | °C. | 11.32 | 11.09 | 8.52 | 9.31 |
| Enthalpy 1st fusion | J/g | 61.04 | 57.89 | 61.01 | 59.53 |
| Tensile | MPa | 26.34 | 28.65 | 30.85 | 27.12 |
| Elongation | % | 260.6 | 279.4 | 423.7 | 295.5 |
| TII |  | 21 | 21 | 25 | 17 | nated surfactant in a ratio of 95-100:0-5 was added. The reactor was then heated up to the reaction temperature of 85 to 90° C. and pressurized to 24 Kg/cm² with tetrafluoroethylene (TFE) monomer. Thereafter, initiators ammonium persulfate (7.14 ppm) and disuccinic acid peroxide (514.28 ppm) were added the reaction vessel to initiate the polymerization reaction. After initiating the polymerization reaction, and consumption of 5.4% of total TFE consumption, the second surfactant combination comprising fluorinated and non-fluorinated surfactant in a ratio of 5:95 and disuccinic acid peroxide (428.57 ppm) were added in one-shot into the polymerization reactor.

Upon consumption of 24 kg of TFE in the polymerization reaction, the reactor was brought to ambient temperature and the residual unreacted monomer was vented to atmospheric pressure for recovery. The aqueous reaction medium con- The invention may be embodied in other specific forms without departing from the spirit or essential characteristics thereof. The present embodiments are therefore, to be considered in all respects as illustrative and not restrictive.

We claim:

1. A process for polymerizing fluoromonomers in an aqueous dispersion medium to form a fluoropolymer, comprising the following steps:
   a) forming an aqueous solution comprising a first surfactant combination of at least one fluorinated surfactant and at least one non-fluorinated surfactant in a polymerization reactor;
   b) pressurizing the polymerization reactor with said fluoromonomers;
   c) initiating a polymerization reaction of said fluoromonomers with initiator selected from Potassium permanganate (KMnO4), Disuccinic Acid Peroxide (DSAP), Ammonium Persulphate (APS), redox initiators or combinations thereof to form said fluoropolymer;

d) propagation of said polymerization reaction, wherein a second surfactant combination of at least one fluorinated surfactant and at least one non-fluorinated surfactant is metered or in one shot dose into the polymerization reactor;

e) termination of said polymerization reaction after consumption of a desired quantity of said fluoromonomers; wherein, the proportions between the at least one fluorinated surfactant and the at least one non-fluorinated surfactant within the first surfactant combination are either the same or different from the proportions between the at least one fluorinated surfactant and the at least one non-fluorinated surfactant within the second surfactant combination.

2. The process as claimed in claim 1, wherein the process is devoid of passivating the at least one non-fluorinated surfactant in the first surfactant combination and/or the second surfactant combination.

3. The process as claimed in claim 1, wherein the second surfactant combination is metered or one shot dosed into the polymerization reactor during the polymerization reaction at a predetermined rate.

4. The process as claimed in claim 1, wherein the aqueous dispersion comprises paraffin wax as stabilizing agent.

5. The process as claimed in claim 1, wherein the at least one fluorinated surfactant within the first surfactant combination is either the same as or different from the at least one fluorinated surfactant within the second surfactant combination.

6. The process as claimed in claim 1, wherein the at least one non-fluorinated surfactant within the first surfactant combination is either the same as or different from the at least one non-fluorinated surfactant within the second surfactant.

7. The process as claimed in claim 1, wherein the at least one fluorinated surfactant has structure represented by formula 1:

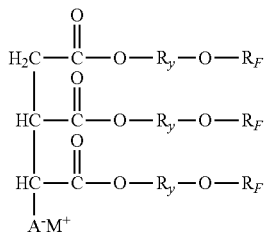

Wherein, $R_F$—is a fully or partially fluorinated linear or branched alkyl group with carbon number 2 to 5, Ry—branched or unbranched alkylene group with carbon number 2 to 6, A− contains at least one anionic head group selected from —COO—, —SO₃, M+ is a monovalent cation selected from hydrogen, an alkali metal, or ammonium ion.

8. The process as claimed in claim 1, wherein Non-fluorinated disulfonate type hydrocarbon containing surfactant has a structure represented by Formula 2:

$$R_1\text{—}[Ar_nX_{n-1}]\text{—}(SO_3M^+)_m \qquad \text{Formula 2}$$

Wherein,

R—being an alkyl group consisting of a number of 2 to 20 carbon atoms;

l—being an integer ranging from 1 to 2

Ar—being an aryl group;

n—being an integer ranging from 1 to 2;

X—being a bridging between aryl groups Ar, wherein the bridging is $CH_2$ or linkage by either an ether or an amine function or $N(C_2H_5)_3$ or carbonyl group (C=O)

$M^+$ being a monovalent cation consisting of hydrogen, an alkali metal, $NH_4^+$ or combinations thereof; and m being an integer ranging from 1 to 2.

9. The process as claimed in claim 1, wherein the first surfactant combination comprises the at least one fluorinated surfactant in an amount higher than the at least one non-fluorinated surfactant and/or wherein the second surfactant combination comprises the at least one fluorinated surfactant in an amount smaller than the at least one non-fluorinated surfactant.

10. The process as claimed in claim 1, wherein the first surfactant combination and/or the second surfactant combination comprises only one fluorinated and/or only one non-fluorinated surfactant.

* * * * *